United States Patent
Hiroki

(10) Patent No.: US 7,313,055 B2
(45) Date of Patent: Dec. 25, 2007

(54) MAGNETIC DOMAIN WALL DISPLACEMENT TYPE MAGNETO-OPTICAL RECORDING MEDIUM

(75) Inventor: Tomoyuki Hiroki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 726 days.

(21) Appl. No.: 10/725,027

(22) Filed: Dec. 2, 2003

(65) Prior Publication Data

US 2004/0109391 A1   Jun. 10, 2004

(30) Foreign Application Priority Data

Dec. 3, 2002   (JP) ............... 2002-351435

(51) Int. Cl.
   *G11B 11/00* (2006.01)
(52) U.S. Cl. ................... 369/13.08; 369/13.52
(58) Field of Classification Search .............. None
   See application file for complete search history.

(56) References Cited

U.S. PATENT DOCUMENTS

| 6,027,825 | A | 2/2000 | Shiratori et al. | 428/694 ML |
|---|---|---|---|---|
| 6,125,083 | A | 9/2000 | Nishimura et al. | 369/13 |
| 6,150,038 | A | 11/2000 | Hirokane et al. | 428/638 |
| 6,265,062 | B1 | 7/2001 | Shiratori | 428/332 |
| 6,403,148 | B1 | 6/2002 | Shiratori et al. | 427/128 |
| 6,707,767 | B2 * | 3/2004 | Hiroki | 369/13.38 |
| 6,894,954 | B2 | 5/2005 | Aoki | 369/13.44 |
| 7,012,857 | B2 * | 3/2006 | Murakami et al. | 369/13.42 |
| 7,173,885 | B2 * | 2/2007 | Miyakoshi et al. | 369/13.52 |
| 2002/0085457 | A1 | 7/2002 | Hiroki | 369/13.08 |
| 2002/0089898 | A1 | 7/2002 | Hiroki | 369/13.08 |
| 2004/0163097 | A1 * | 8/2004 | Miyakoshi et al. | 369/13.38 |

FOREIGN PATENT DOCUMENTS

JP   06-290496   10/1994

(Continued)

OTHER PUBLICATIONS

High-Density Magneto-Optical Recording With Domain Wall Displacement Detection, Shiratori et al, Proceeding Of Magneto-optical Recording International Symposium, vol. 22, pp. 47-50, 1998.*

*Primary Examiner*—Tan Dinh
(74) *Attorney, Agent, or Firm*—Fitzpatrick, Cella, Harper & Scinto

(57) ABSTRACT

Provided is a magneto-optical recording medium capable of accurately reproducing a signal of a recording density exceeding a resolution of an optical system without making a constitution thereof complicated. The magnetic domain wall displacement type magneto-optical recording medium, comprises: a magnetic domain wall displacement layer in which a magnetic domain wall moves to contribute to information reproduction; a memory layer holding a recorded magnetic domain corresponding to the information; and a switching layer which is arranged between the magnetic domain wall displacement layer and the memory layer and has a Curie temperature lower than Curie temperatures of the magnetic domain wall displacement layer and the memory layer. In the recording medium, the magnetic domain wall displacement layer is constituted of two or more magnetized films, and a magnitude of a net magnetization of the magnetic domain wall displacement layer in a temperature range from the Curie temperature of the switching layer to the Curie temperature of the magnetic domain wall displacement layer is substantially zero.

3 Claims, 8 Drawing Sheets

FOREIGN PATENT DOCUMENTS

| | | |
|---|---|---|
| JP | 7-334877 | 12/1995 |
| JP | 10-092031 | 4/1998 |
| JP | 2000-021036 | 1/2000 |
| JP | 2000-163815 | 6/2000 |
| JP | 2002-208195 | 7/2002 |
| JP | 2003-203405 | 7/2003 |

\* cited by examiner

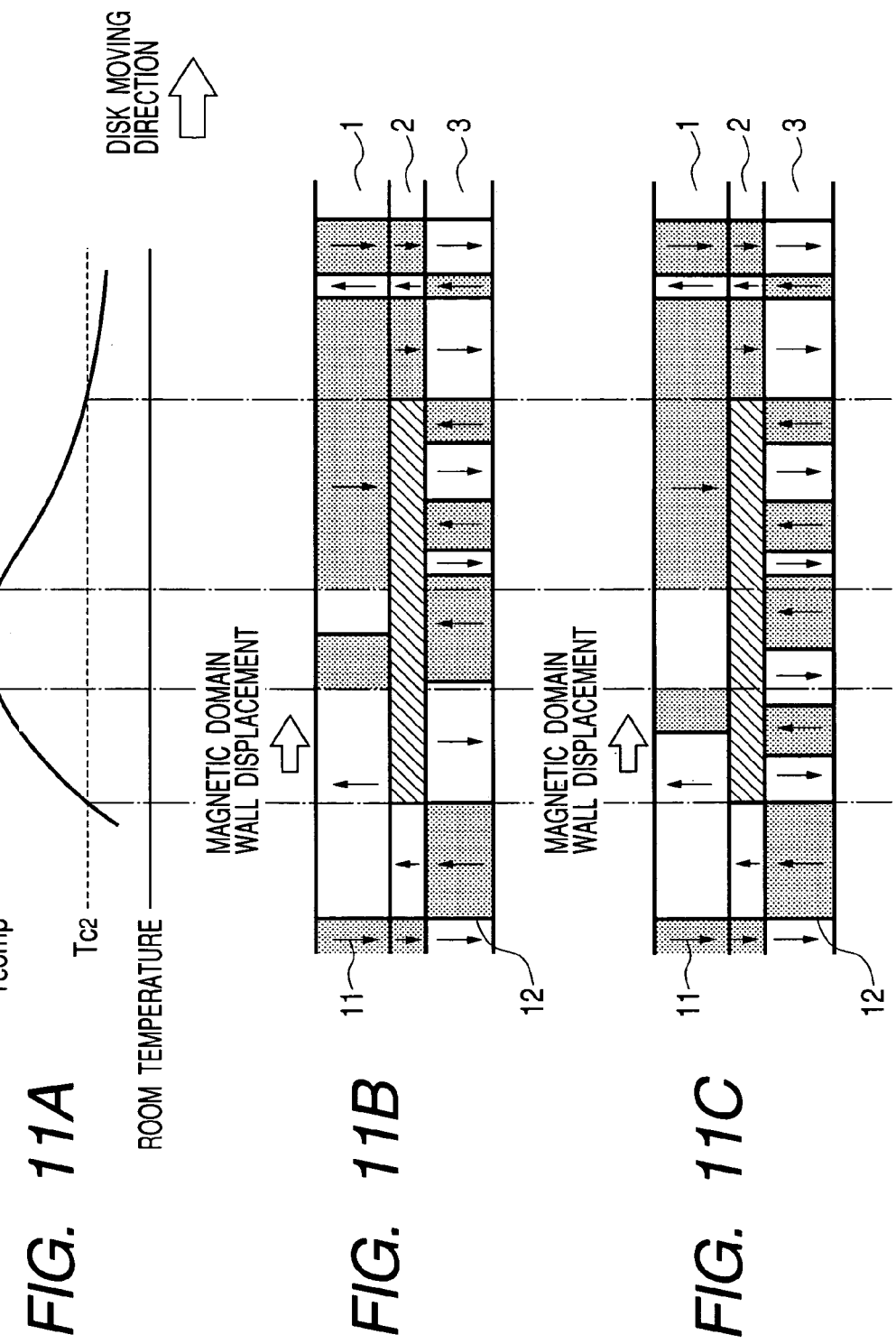

MAGNETIC DOMAIN WALL DISPLACEMENT TYPE MAGNETO-OPTICAL RECORDING MEDIUM

BACKGROUND OF THE INVENTION

1. Field of the Invention

The present invention relates to a magneto-optical recording medium that performs recording and reproduction of information with a laser beam utilizing a magneto-optical effect. In particular, the present invention relates to a magnetic domain wall displacement type magneto-optical recording medium that moves a magnetic domain wall of a recorded magnetic domain to expand the recorded magnetic domain for reproduction.

2. Related Background Art

In recent years, as a rewritable high-density recording system, a magneto-optical recording medium and a recording and reproducing device, which write a magnetic domain in a magnetic thin film using thermal energy of a semiconductor laser to record information and read out the recorded information using the magneto-optical effect, are attracting attention. The magneto-optical recording medium is gradually spreading used as a large capacity removable information recording medium in a computer or the like. Recently, data handled by a computer or other information processing apparatus has diversified into various kinds of information such as voices, images, and motion pictures, and a data size necessary for such information is continuously increasing. Therefore, there has been increasing requirement for making recording density of the magneto-optical recording medium higher to further enlarge the capacity of the recording medium.

The magneto-optical recording medium is more excellent in terms of a recording density than other optical recording medium in that it can record a mark finer than a resolution limit of an optical system and can reproduce the recorded mark. For example, Japanese Patent Application Laid-Open No. H7-334877 discloses a magnetic super resolution and reproduction system which is an example of such a magneto-optical recording and reproduction system. Moreover, as a system for recording a magnetic domain finer than a resolution limit of an optical system, there is generally known a magnetic field modulation system with a modulation speed of an external magnetic field sufficiently increased.

In addition, Japanese Patent Application Laid-Open NO. H6-290496 discloses a reproducing method in which a magnetic domain wall displacement layer having a small magnetic domain wall coercive force is provided on an incident side of reproduction light in a magneto-optical recording medium, and a magnetic domain wall of the magnetic domain wall displacement layer is moved to a high temperature side utilizing a temperature gradient in a reproducing spot to thereby expand a magnetic domain in the spot for reproduction. According to this method, even if a recorded mark size is reduced, a signal is reproduced while the magnetic domain is expanded. Thus, the reproduction light can be used effectively, and a resolution can be increased without reducing a signal amplitude.

Moreover, Japanese Patent Application Laid-Open NO. H10-92031 indicates an attempt to improve characteristics of the magneto-optical recording medium disclosed in Japanese Patent Application Laid-Open NO. H6-290496 by devising the magnetic domain wall displacement layer thereof. In other words, a saturation magnetization in a temperature range in which the magnetic domain wall moves is set to 20 emu/cc or less by adjusting a composition of a single magnetic domain wall displacement layer. However, with this constitution in which a single layer is adjusted, a temperature difference $\Delta T$ between a lowest temperature $T_s$, at which an interface magnetic domain wall energy $\sigma_w$ is reduced to zero, and a Curie temperature $T_c$ of the magnetic domain wall displacement layer cannot be increased. In order to perform high quality signal reproduction, it is desirable to increase $\Delta T$ to 120° C. or more such that a Kerr rotation angle becomes larger. In that case, it is difficult to suppress the saturation magnetization in the entire temperature range in which the magnetic domain wall moves. In addition, an attempt to form a magnetic domain wall displacement layer, which has a composition in the vicinity of a compensation composition, as a multilayer is also performed as another embodiment in Japanese Patent Application Laid-Open NO. H10-92031. However, in that example, a Curie temperature of the magnetic domain wall displacement layer is simply changed stepwise, and the saturation magnetization in the temperature range in which the magnetic domain wall moves is not taken into account.

The reproduction method utilizing magnetic domain wall movement disclosed in Japanese Patent Application Laid-Open NO. H6-290496 is a method particularly excellent in a track recording density among super-resolution systems. In other words, the method has a characteristic that, if a displacement amount of a magnetic domain wall is always constant, a constant reproduced signal amplitude can be obtained regardless of a size of a recorded magnetic domain. However, in addition to a temperature gradient, a magnetostatic force is applied as a force for displacement the magnetic domain wall in a reproducing spot. The magnetostatic force is not always negligibly small. This magnetostatic force is applied from a leaked magnetic field from a memory layer or an optical head and acts in a direction of preventing the movement of the magnetic domain wall in some cases. Thus, in such a case, the displacement amount of the magnetic domain wall is not constant, and stable information reproduction may not be performed.

SUMMARY OF THE INVENTION

The present invention has been accomplished in order to solve the above-mentioned problems, and it is an object of the present invention to provide a magneto-optical recording medium which is capable of accurately reproducing a signal of a recording density exceeding a resolution of an optical system without making a constitution of a recording medium complex.

A magneto-optical recording medium according to the present invention comprises: a magnetic domain wall displacement layer in which a magnetic domain wall moves to contribute to information reproduction; a memory layer holding a recorded magnetic domain corresponding to the information; and a switching layer which is arranged between the magnetic domain wall displacement layer and the memory layer and has a Curie temperature lower than Curie temperatures of the magnetic domain wall displacement layer and the memory layer, wherein a magnitude of a net magnetization of the magnetic domain wall displacement layer in a temperature range from the Curie temperature of the switching layer to the Curie temperature of the magnetic domain wall displacement layer is substantially zero.

BRIEF DESCRIPTION OF THE DRAWINGS

FIGS. 11A, 11B, and 11C are diagrams showing a structure and operations of a magneto-optical recording medium of Comparative Example 2.

DETAILED DESCRIPTION OF THE PREFERRED EMBODIMENTS

Figure 1A:
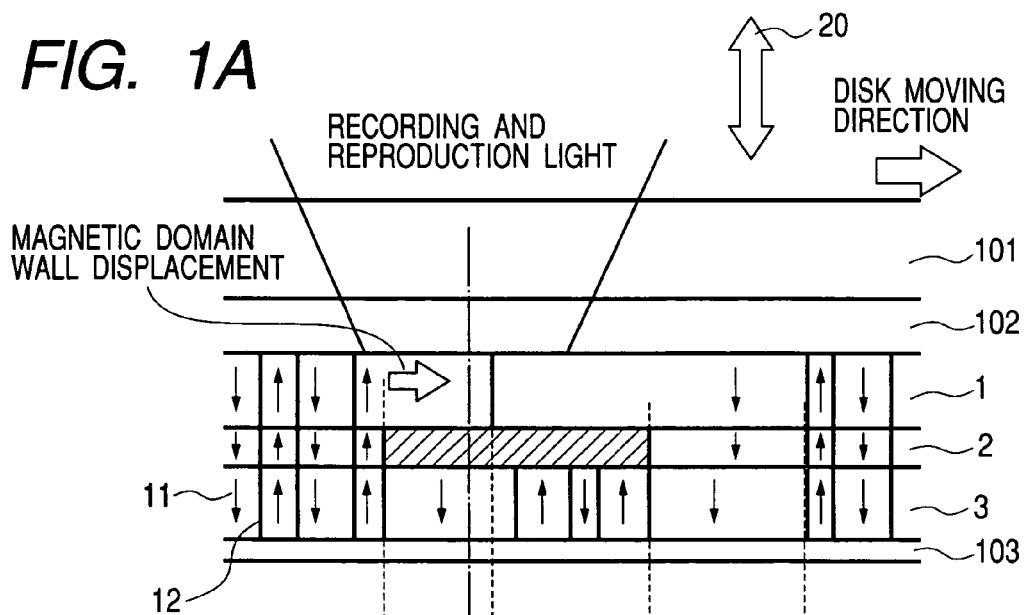
FIGS. 1A, 1B, and 1C are diagrams showing a structure and operations of a magneto-optical recording medium of an embodiment of the present invention.
Figure 1B:
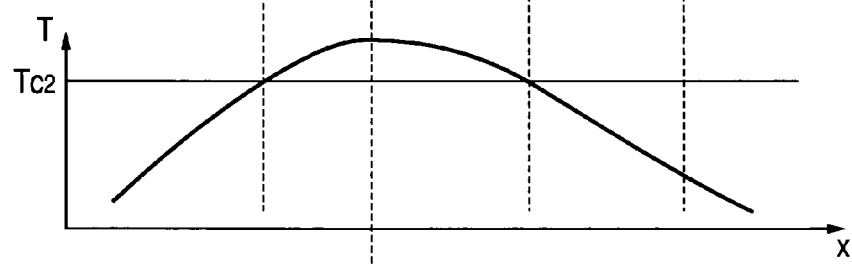
Figure 1C:
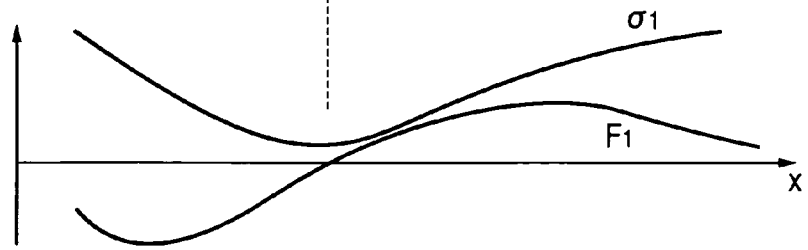

Next, a preferred embodiment of the present invention will be described with reference to the accompanying drawings. FIGS. 1A to 1C are diagrams illustrating a structure of a magneto-optical recording medium and a principle of operation thereof (recording and reproducing principle) in a first embodiment of the present invention. FIG. 1A shows a sectional structure of a magneto-optical disk of this embodiment which is constituted as an optical disk. FIG. 1B shows a temperature distribution in a center of a track at the time when a magneto-optical recording medium (disk) has moved to the right while a laser beam is irradiated. FIG. 1C shows distributions of a magnetic domain wall energy density $\sigma_1$ in a magnetic domain wall displacement layer and a force $F_1$ acting against a magnetic domain wall of the magnetic domain wall displacement layer.

As shown in FIG. 1A, the magneto-optical recording medium is constituted by stacking an enhancement layer 102, a magnetic domain wall displacement layer 1, a switching layer 2, a memory layer 3, and a protective layer 103 one after another on a substrate 101. Those respective layers can be deposited and formed on the substrate 101 by continuous sputtering, continuous evaporation or the like using a magnetron sputtering device. Here, all of the magnetic domain wall displacement layer 1, the switching layer 2, and the memory layer 3 are formed of an amorphous alloy of a rare earth element and an iron group element. At least the memory layer 3 is a perpendicularly magnetized film at a room temperature. Arrows 11 in those respective magnetic films represent directions of a transition metal (iron group) sublattice magnetization of recorded magnetic domains held in the films. In parts where adjacent two recorded magnetic domains are not magnetized in same direction, Bloch magnetic domain walls 12 (indicated by bold lines in the figure) exist.

Usually, a transparent material such as glass or polycarbonate is used for the substrate 101. The enhancement layer 102 is a layer provided for the purpose of enhancing a magneto-optical effect. For example, a transparent dielectric material such as $Si_3N_4$, AlN, $SiO_2$, SiO, ZnS, and $MgF_2$ is used for the enhancement layer 102. In the magneto-optical recording medium shown in FIG. 1, a laser beam used for recording or reproduction is incident from the substrate 101 side. The protective layer 103 is a layer provided for the purpose of protecting the magnetic layers. The same material as the enhancement layer 102 is used for the protective layer 103. In addition, in order to optimize a thermal structure of the entire magneto-optical recording medium, a metal layer formed of Al, AlTa, AlTi, AlCr, AlSi, Cu, or the like may be further provided on the protective layer 103. The enhancement layer 102, the protective layer 103, and the metal layer provided as required are well known for those skilled in the art as components of the magneto-optical recording medium. Thus, detailed description of the layers will be omitted here.

For the memory layer 3, a material with large perpendicular magnetic anisotropy that enables fine recording pits to be stably stored, such as an amorphous alloy of a rare earth element and an iron group element is used. Examples of such alloy includes TbFeCo, DyFeCo, and TbDyFeCo. When a Curie temperature of the memory layer 3 is represented by $T_{c3}$, it is preferable to use a material having a compensation temperature between the room temperature and $T_{c3}$. Recorded information in the magneto-optical recording medium is held such that a magnetization direction of the magnetic domain of the memory layer 3 is an upward or downward direction. In addition, a perpendicularly magnetized film of garnet, Pt/Co, Pd/Co, or the like may be used as the memory layer 3 such that the memory layer 3 can magnetically transfer information to the other layers.

The switching layer 2 is formed of an amorphous alloy of a rare earth element and an iron group element such as GdCo, GdFeCo, GdFe, GdFeCoAl, DyFeCoAl, TbFe, TbFeCo, TbFeCoAl, TbDyFeCoAl, and TbFeAl. A Curie temperature of the switching layer 2 is set lower than that of the other layers. The Curie temperature of the switching layer 2 is represented by $T_{c2}$.

For the magnetic domain wall displacement layer 1, for example, an amorphous alloy of a rare earth element and an iron group element with relatively small vertical magnetization anisotropy such as GdCo, GdFeCo, GdFe, or NdGdFeCo, or a material for magnetic bubble memory such as garnet is desirable. In addition, it is preferable to use a material having a compensation composition. In particular, in the present invention, it is preferable to set a magnetic domain wall coercive force of the magnetic domain wall displacement layer 1 smaller than that of the memory layer 3. A Curie temperature of the magnetic domain wall displacement layer 1 is represented by $T_{c1}$. In the magneto-optical recording medium of this embodiment, the magnetic domain wall displacement layer 1 is constituted by stacking at least two magnetic layers. A net magnitude of a magnetization of the magnetic domain wall displacement layer 1 is set to be substantially zero in a temperature range from the Curie temperature $T_{c2}$ of the switching layer 2 to the Curie temperature $T_{c1}$, of the magnetic domain wall displacement layer 1. The Curie temperature $T_{c1}$ of the magnetic domain wall displacement layer 1 in this context means a Curie temperature of a magnetic layer having a highest Curie temperature among the plural magnetic layers constituting the magnetic domain wall displacement layer 1.

The Curie temperatures of the magnetic domain wall displacement layer 1, the switching layer 2, and the memory layer 3 satisfy the following relation:

$$T_{c1}, T_{c3} > T_{c2}.$$

At the room temperature, a magnetic domain recorded in the memory layer 3 is transferred to the magnetic domain wall displacement layer 1 by exchange coupling.

Film thicknesses of the enhancement layer 102, the magnetic domain wall displacement layer 1, the switching layer 2, the memory layer 3, and the protective layer 103 in this magneto-optical recording medium are 20 to 100 nm, 20 to 40 nm, 7 to 20 nm, 40 to 100 nm, and 40 to 80 nm, respectively.

In the magneto-optical recording medium of this embodiment, a protective coat layer formed of a polymeric resin may be added to the above-mentioned structure. Alternatively, the substrate 101 after film formation may be bonded to the above-mentioned layers. In addition, the layers may be stacked in an order opposite to that described above to make light incident on the substrate 101 from the opposite side at the time of recording and reproduction.

Recording of a data signal in such a magneto-optical recording medium of this embodiment is performed by irradiating a laser beam having a power sufficient for heating the memory layer 3 up to around the Curie temperature $T_{c3}$, on the medium while displacement the medium formed in a disk shape to thereby modulate an external magnetic field applied to the memory layer 3. In this case, if a modulation frequency of the external magnetic field is increased, a recorded magnetic domain smaller than an optical spot diameter can be formed. As a result, the signal can be recorded in the memory layer 3 at a cycle smaller than diffraction limit of light.

FIG. 1B shows a temperature distribution in a center of a track at the time when the magneto-optical recording medium has moved to the right as seen in the figure while a laser beam is irradiated on this magneto-optical recording medium (optical disk). A position where a film temperature becomes the highest in this temperature profile is slightly further to the back of the magneto-optical recording medium than a center of a laser spot depending upon a linear speed of movement of the magneto-optical recording medium. FIG. 1C shows a distribution of a magnetic domain wall energy density $\sigma_1$ in the magnetic domain wall displacement layer 1 at that point. As shown in the figure, the magnetic domain wall energy density $\sigma_1$ decreases as the film temperature rises. Therefore, if there is a temperature gradient along the displacement direction of the magneto-optical recording medium, the magnetic domain wall energy density $\sigma_1$ decreases toward the highest temperature position. Then, a force $F_1$ represented by the following expression acts on a magnetic domain wall 12 of the magnetic domain wall displacement layer 1 existing in a position x:

$$F_1 = d\sigma_1/dx$$

This force $F_1$ acts on the magnetic domain wall 12 so as to move the wall to a position where a magnetic domain wall energy is low. The magnetic domain wall displacement layer 1 is set to have a small magnetic domain wall coercive force and a large magnetic domain wall mobility. Thus, the magnetic domain wall 12 as a single magnetic domain wall moves easily in the magnetic domain wall displacement layer 1 with the action of this force $F_1$.

Here, operations at the time of reproduction will be described. In FIG. 1A, in an area before a laser beam for reproduction is irradiated on the magneto-optical recording medium (an area on the left end side of the figure), that is, in a part corresponding to the room temperature, all the magnetic layers (the magnetic domain wall displacement layer 1, the switching layer 2, and the memory layer 3) are perpendicularly magnetized walls. A magnetic domain recorded in the memory layer 3 is exchange-coupled with the magnetic domain wall displacement layer 1 via the switching layer 2 and is transferred to the magnetic domain wall displacement layer 1. At this point, a Bloch magnetic domain wall 12 exists among magnetic domains 11 oriented in opposite directions (indicated by arrows in the layers) from each other. Here, the magnetic domain wall displacement layer 1 and the switching layer 2 do not always have to be perpendicularly magnetized films at the room temperature. The magnetic domain wall displacement layer 1 and the switching layer 2 may turn into perpendicularly magnetized films immediately before the layers approach an irradiation position of a laser beam and a film temperature thereof rises to reach the Curie temperature $T_{c2}$ of the switching layer 2 to be exchange coupled with the magnetic domain of the memory layer 3. When the film temperature reaches $T_{c2}$, the exchange coupling from the memory layer 3 to the switching layer 2 is cut, the magnetic domain wall displacement layer 1 with a small magnetic domain wall coercive force cannot hold the magnetic domain. Then, magnetic domain wall 12 moves to a high temperature side (in the right direction in the figure) in accordance with the force $F_1$ applied thereto by the temperature gradient. At this point, a speed of movement of the magnetic domain wall 12 is sufficiently high compared with a displacement speed of the magneto-optical recording medium. Thus, a magnetic domain larger than the magnetic domain recorded in the memory layer 3 is obtained in the laser spot.

At the time of recording, power of the laser beam irradiated on the magneto-optical recording medium is made higher than that at the time of reproduction, whereby the medium is heated to a temperature higher than the Curie temperature $T_{c3}$ of the memory layer 3, and a direction of a recording magnetic field 20 is modulated according to recorded data. Accordingly, a recorded magnetic domain corresponding to the recorded data can be recorded in the medium. The recording magnetic field 20 is a magnetic field which is perpendicular to a film surface of the magneto-optical recording medium and changes to act upward or downward according to the recorded data.

Next, film characteristics, in particular, magnetic characteristics of the respective magnetic layers (the magnetic domain wall displacement layer 1, the switching layer 2, and the memory layer 3) constituting such a magneto-optical recording medium will be examined.

In general, the film characteristics of the switching layer 2 and the memory layer 3 can be considered as described below.

When the Curie temperature $T_{c2}$ of the switching layer 2 is too low, transfer of a recorded magnetic domain from the memory 3 to the magnetic domain wall displacement layer 1 at the room temperature tends to be incomplete. In addition, a temperature gradient is gentle, and therefore a position where the magnetic domain wall starts to move becomes indefinite. Thus, the Curie temperature $T_{c2}$ of the switching layer 2 is set between 100° C. and 200° C. to provide a certain degree of temperature difference from the room temperature. In addition, in order to reduce a floating magnetic field from the switching layer 2, a composition in which a compensation temperature is nearly the Curie temperature $T_{c2}$ is selected.

In order to prevent a recorded magnetic domain from deteriorating due to temperature rise during reproduction, a Curie temperature of the memory layer 3 is set such that a difference between the Curie temperature of the memory layer 3 and the Curie temperature of the switching layer 2 is large. More specifically, the Curie temperature $T_{c3}$ of the memory layer 3 is set to around 300° C. In addition, in order to perform stable recording, a saturation magnetization is increased to some extent in the vicinity of the Curie temperature $T_{c3}$. Further, in order to reduce a floating magnetic field at a reproduction temperature (temperature to which the magneto-optical recording medium reaches at the time of reproduction) as much as possible, a compensation temperature of the memory layer 3 is set between the room temperature and a temperature in the vicinity of the Curie temperature $T_{c2}$ of the switching layer 2. For example, in the case in which the compensation temperature of the memory layer 3 is close to the room temperature, a saturation magnetization of the memory layer 3 at the reproduction temperature reaches as high as about 100 emu/cc. This is a level at which movement of the magnetic domain wall 12 in the magnetic domain wall displacement layer 1 is affected.

Figure 2:
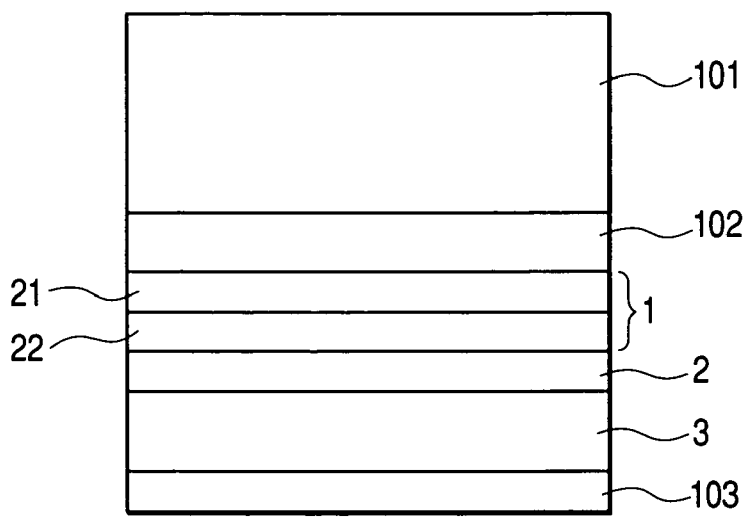
FIG. 2 is a schematic sectional view showing a magneto-optical recording medium having a magnetic domain wall displacement layer of a two-layer structure.
Figure 3:
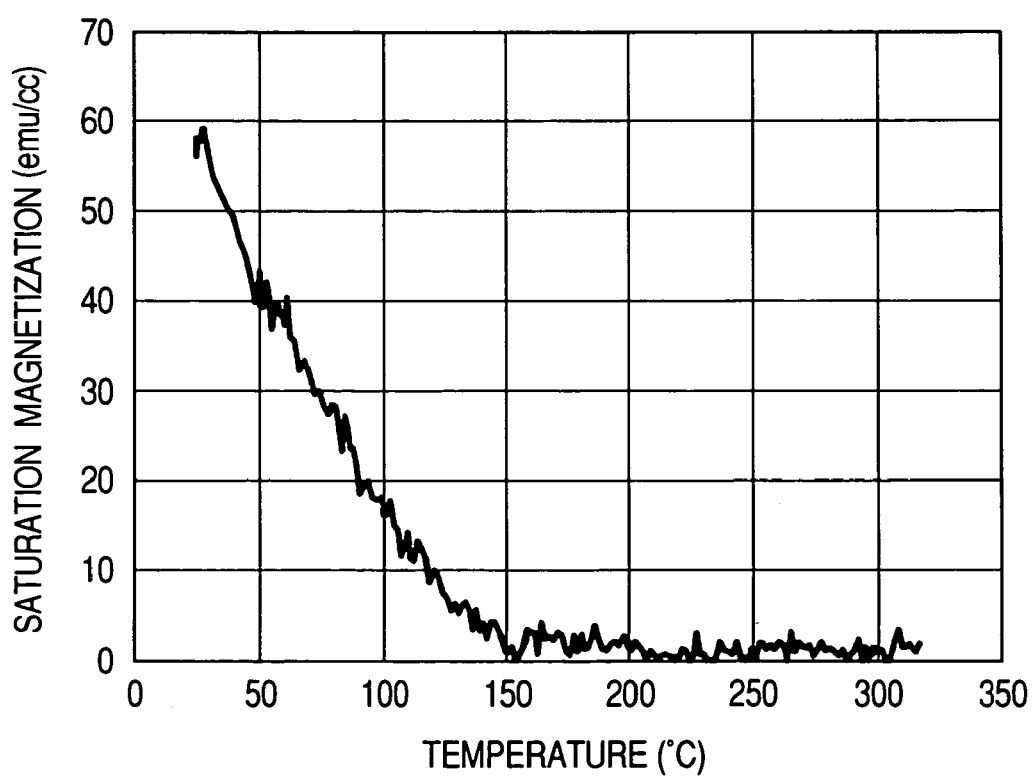
FIG. 3 is a graph showing temperature dependency of a net saturation magnetization of only the magnetic domain wall displacement layer in the magneto-optical recording medium shown in FIG. 2.

Thus, in this embodiment, two or three magnetic layers are stacked in the magnetic domain wall displacement layer 1 such that a saturation magnetization of one magnetic layer cancels a saturation magnetization of another magnetic layer. FIG. 2 shows a sectional structure of a magneto-optical recording medium in the case in which a magnetic domain wall displacement layer with two magnetic layers (a first layer 21 and a second layer 22) stacked is used as the magnetic domain wall displacement layer 1. The same reference numerals as those in FIG. 1 denote the same members. FIG. 3 shows temperature characteristics of a net saturation magnetization of the magnetic domain wall displacement layer 1 in the case of the structure shown in FIG. 2. As is seen from FIG. 3, film formulation method of the first layer 21 and the second layer 22, which constitute the magnetic domain wall displacement layer 1, is selected such that a net saturation magnetization in a temperature range from the Curie temperature $T_{c2}$ of the switching layer 2 to the Curie temperature $T_{c1}$ of the magnetic domain wall displacement layer 1 is substantially zero. In order to reduce a saturation magnetization to substantially zero over such a wide temperature range, when Curie temperatures and compensation temperatures of the first layer 21 and the second layer 22 are assumed to be $T_{c21}$, $T_{c22}$, $T_{comp21}$, and $T_{comp22}$, respectively, a relation among the temperatures is set as $T_{c21} \geq T_{comp21} > T_{c22} > T_{comp22}$ such that a saturation magnetization at each temperature is balanced. The first layer 21 and the second layer 22 are exchange coupled. Therefore, $T_{c22}$ is set in accordance with a rapid increase in a saturation magnetization of the first layer 21 such that a rare earth sublattice magnetization is predominant at a temperature slightly lower than $T_{comp21}$, and a transition metal (iron group) sublattice magnetization is made predominant in the second layer 22, whereby the first layer 21 and the second layer 22 can mutually cancel the saturation magnetizations.

In addition, a temperature difference between $T_{comp21}$ and $T_{c21}$ is set to 30° C. or less, a saturation magnetization of the first layer 21 between $T_{comp21}$ and $T_{c21}$ is reduced. As a result, the net saturation magnetization of the magnetic domain wall displacement layer 1 can be reduced in a temperature range from a certain temperature $T_1$ between $T_{c22}$ and $T_{comp22}$ (about 150° C. in an example of FIG. 3) to $T_{c21}$. Moreover, the Curie temperature $T_{c2}$ of the switching layer 2 is set to the temperature in the vicinity of the temperature $T_1$, whereby the net saturation magnetization of the magnetic domain wall displacement layer 1 can be reduced to substantially zero over a temperature range from the Curie temperature $T_{c2}$ of the switching layer 2 to the Curie temperature $T_{c1}$ of the magnetic domain wall displacement layer 1. In actuality, the net saturation magnetization cannot be reduced to zero completely. However, as is apparent from Examples described later, it is preferable to set the net saturation magnetization of the magnetic domain wall displacement layer 1 to 15 emu/cc or less, more preferably 5 emu/cc or less in a temperature range from the Curie temperature $T_{c2}$ of the switching layer 2 to the Curie temperature $T_{c1}$ of the magnetic domain wall displacement layer 1.

Figure 4:
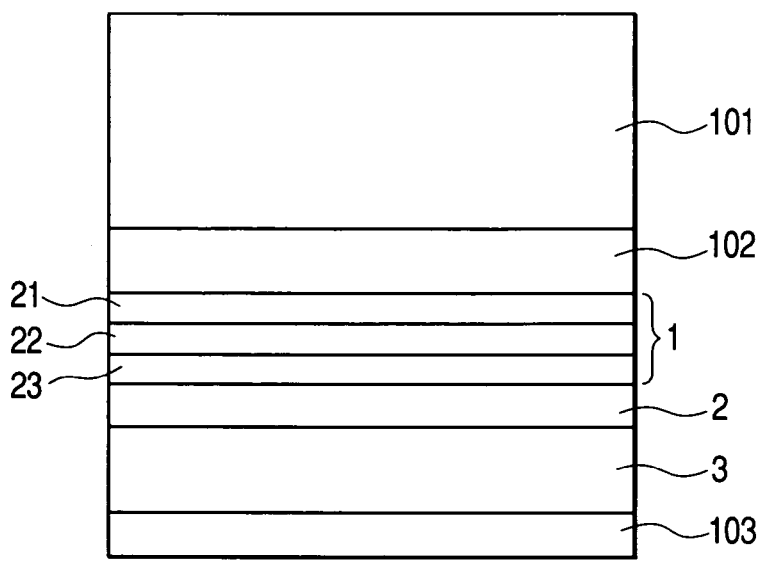
FIG. 4 is a schematic sectional view showing a magneto-optical recording medium having a magnetic domain wall displacement layer of a three-layer structure.
Figure 5:
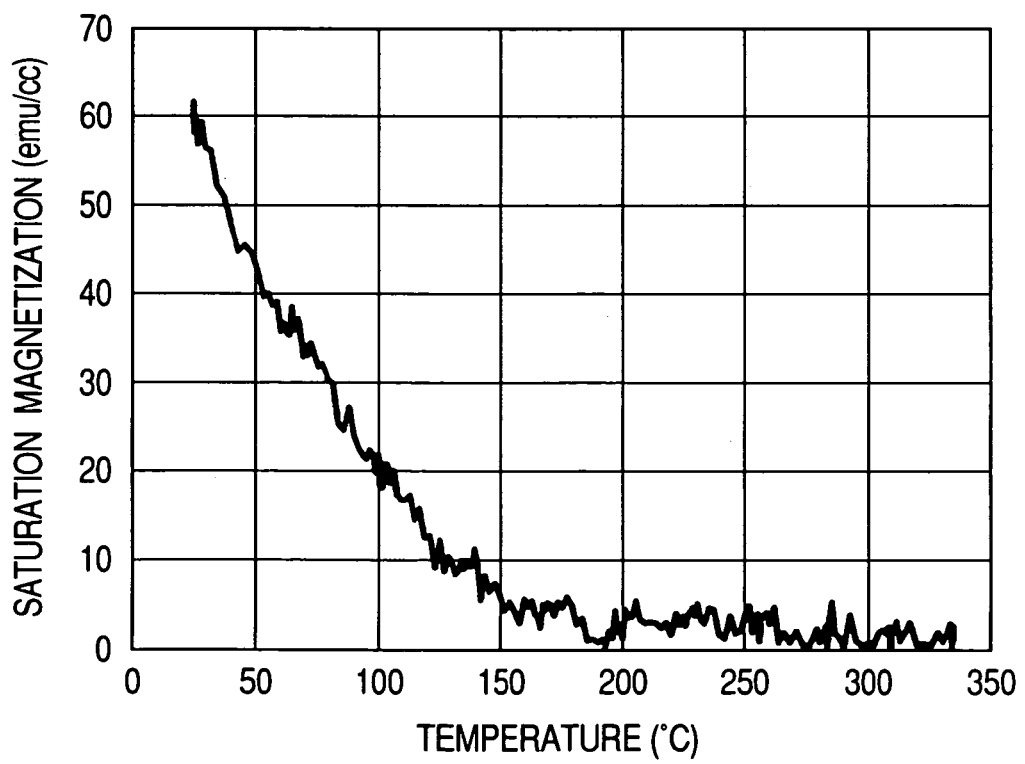
FIG. 5 is a graph showing temperature dependency of a net saturation magnetization of only the magnetic domain wall displacement layer in the magneto-optical recording medium shown in FIG. 4.

FIG. 4 shows a sectional structure of a magneto-optical recording medium in the case in which a magnetic domain wall displacement layer with three magnetic layers (a first layer 21, a second layer 22, and a third layer 23) stacked is used as the magnetic domain wall displacement layer 1. The same reference numerals as those in FIG. 1 denote the same members. FIG. 5 shows temperature characteristics of a net saturation magnetization of the magnetic domain wall displacement layer 1 in the case of the structure shown in FIG. 4. As is seen from FIG. 5, film formulation method of the first layer 21, the second layer 22, and the third layer 23 which constitute the magnetic domain wall displacement layer 1, is selected such that a net saturation magnetization in a temperature range from a certain temperature $T_1$ to the Curie temperature $T_{c1}$ of the magnetic domain wall displacement layer 1 is substantially zero. In this case, as in the case of the magnetic domain wall displacement layer having a two-layer structure, when Curie temperatures and compensation temperatures of the first layer 21, the second layer 22, and the third layer 23 are assumed to be $T_{c21}$, $T_{c22}$, $T_{c23}$, $T_{comp21}$, $T_{comp22}$, and $T_{comp23}$, respectively, a relation among the temperatures is set as $T_{c21} \geq T_{comp21} > T_{c22} > T_{comp22} > T_{c23} > T_{comp23}$ such that a saturation magnetization at each temperature is balanced. At this time as well, the Curie temperature $T_{c2}$ of the switching layer 2 is set to the temperature in the vicinity of the temperature $T_1$. Accordingly it is preferable to set the net saturation magnetization of the magnetic domain wall displacement layer 1 to 15 emu/cc or less, more preferably 5 emu/cc or less in a temperature range from the Curie temperature $T_{c2}$ of the switching layer 2 to the Curie temperature $T_{c1}$ of the magnetic domain wall displacement layer 1.

The film structure of the magnetic domain wall displacement layer 1 is set as described above. Thus, according to the magneto-optical recording medium of this embodiment, stable signal reproduction can be performed without being affected by a floating magnetic field from the memory layer 3 or an external magnetic field.

The present invention will be hereinafter described in more detail on the basis of Examples.

EXAMPLE 1

Respective targets of boron-doped Si, Gd, Tb, Fe, Co, and Al were attached in a chamber of a DC magnetron sputtering device, and a polycarbonate substrate 101 of a disk shape formed in a guide groove for tracking was fixed to a substrate holder in the chamber. Then, the inside of the chamber was exhausted by a cryopump to high vacuum of $1 \times 10^{-5}$ Pa or less. While keeping the vacuum exhausted state, an Ar gas was introduced into the chamber until a pressure in the chamber reached 0.5 Pa, and the respective targets were sputtered to form respective layers of a magneto-optical recording medium on the substrate 101 as described below while the substrate 101 was rotated. Note that, at the time of formation of an SiN layer, an $N_2$ gas was introduced in addition to the Ar gas, and the SiN layer was formed by DC reactive sputtering.

First, an SiN layer was formed to have a thickness of 90 nm as a base layer (enhancement layer 102). Subsequently, a GdFeCoAl layer was formed to have a thickness of 30 nm as the magnetic domain wall displacement layer 1, a TbFeAl layer was formed to have a thickness of 10 nm as the switching layer 2, and a TbFeCo layer was formed to have a thickness of 60 nm as the memory layer 3. Finally, an SiN layer was formed to have a thickness of 50 nm as the protective layer 103.

A composition ratio of the respective magnetic layers was controlled according to a ratio of power to be inputted to the respective targets of Gd, Tb, Fe, Co, and Al. The Curie temperature $T_{c2}$ of the switching layer 2 was adjusted to 150° C., the Curie temperature $T_{c3}$ of the memory layer 3 was adjusted to 320° C., and a compensation temperature of the memory layer 3 was adjusted to about 140° C.

The magnetic domain wall displacement layer 1 was constituted by two layers (the first layer 21 and the second layer 22: a layer closer to the substrate 101 was the first layer 21), each of which had a thickness of 15 nm. The Curie temperatures $T_{c11}$ and $T_{c12}$ of the layers were adjusted to 290° C. and 210° C., respectively, and compensation temperatures thereof were adjusted to 280° C. and 20° C., respectively. When temperature dependency of a net saturation magnetization of only the magnetic domain wall displacement layer 1 was measured, as shown in FIG. 3, the saturation magnetization was 5 emu/cc or less over the entire temperature range from the Curie temperature $T_{c2}$ of the switching layer 2 (150° C.) to the Curie temperature $T_{c1}$ of the magnetic domain wall displacement layer 1 (290° C.).

When recording and reproduction of information was performed with (1-7) modulation using a laser beam with a wavelength of 650 nm, an object lens with an NA (opening ratio) of 0.60, and an external magnetic field of 2500 e while a magneto-optical recording medium (disk) was rotated at a linear speed of 2.4 m/s, a bit error rate of $1 \times 10^{-4}$ was obtained at a recording density of 0.075 µm/bit. In addition, a reproduction power margin was large enough as ±15%, which is sufficient, and a reproduced signal, of which a signal waveform did not depend upon a mark length and which a stable amplitude is realized was obtained.

Note that, in this Example, in order to smoothly perform magnetic domain wall movement, a part between information tracks was subjected to annealing by a high-power laser prior to the recording and reproduction of information such that a magnetic domain wall did not develop on the sides of the tracks.

EXAMPLE 2

Next, an experiment was performed in the case in which a magnetic domain wall displacement layer was formed in a three-layer structure. Conditions for forming layers other than the magnetic domain wall displacement layer 1 are the same as those in Example 1.

In Example 2, the magnetic domain wall displacement layer 1 was constituted by three layers (the first layer 21, the second layer 22, and a third layer 23: a layer closer to the substrate 101 was the first layer 21), each of which had a thickness of 10 nm. Curie temperatures $T_{c11}$, $T_{c12}$, and $T_{c13}$ of the layers were adjusted to 290° C., 240° C., and 190° C., respectively, and compensation temperatures thereof were adjusted to 280° C., 180° C., and 0° C., respectively. A result obtained by measuring temperature dependency of a net saturation magnetization of only the magnetic domain wall displacement layer 1 is shown in FIG. 5. As in the case of Example 1, the saturation magnetization was 5 emu/cc or less over the entire temperature range from the Curie temperature $T_{c2}$ of the switching layer 2 (150° C.) to the Curie temperature $T_{c1}$ of the magnetic domain wall displacement layer 1 (290° C.).

When recording and reproduction of information was performed similarly to Example 1, a bit error rate of $1 \times 10^{-4}$ was obtained at a recording density of 0.075 µm/bit as in Example 1. In addition, a reproduction power margin was slightly decreased to ±13%. However, this is an acceptable level in practical use.

EXAMPLE 3

The same stacked film used in Example 1 was formed on a substrate with a deep step between a land and a groove. The sides of the tracks are magnetically segmented cocurrently with film formation, and the annealing by the high-power laser performed in Example 1 was omitted.

Figure 6:
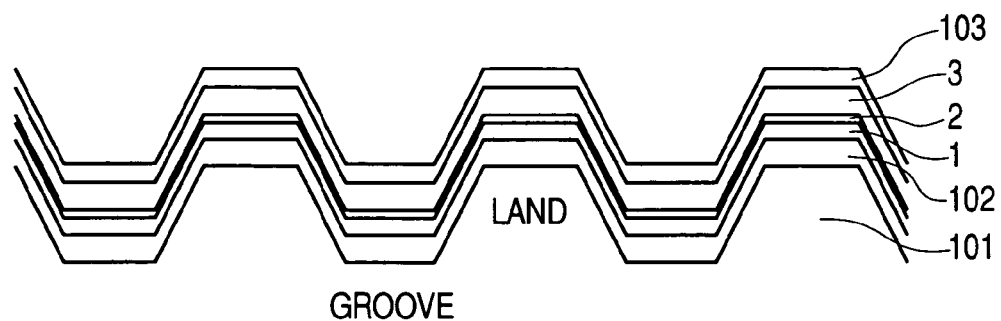
FIG. 6 is a sectional view showing a structure of a main part of a magneto-optical recording medium of Example 3.

FIG. 6 shows a sectional view of a magneto-optical recording medium (optical disk) manufactured in Example 3. The same reference numerals as those in FIG. 1 denote the same members. A rectangular guide groove with a depth of 160 nm was formed on the substrate 101. Films were formed on this substrate 101 with the same film formulation method as Example 1. More precisely, although films also deposit more or less in a taper portion (step portion) corresponding to a boundary of the land and the groove, a film thickness is extremely small compared with the land/groove portion, and therefore magnetic combination in the step portion can be neglected. In respective aspects of the present invention, this magneto-optical recording medium corresponds to a structure in which the magnetic domain wall displacement layer is magnetically segmented among the respective information tracks.

When recording and reproduction of information was performed on this disk using the same optical head as Example 1, a reproduced signal equivalent to that of Example 1 was obtained. In addition, a recording density in a track pitch direction could be improved by performing land/groove recording.

EXAMPLE 4

Figure 7:
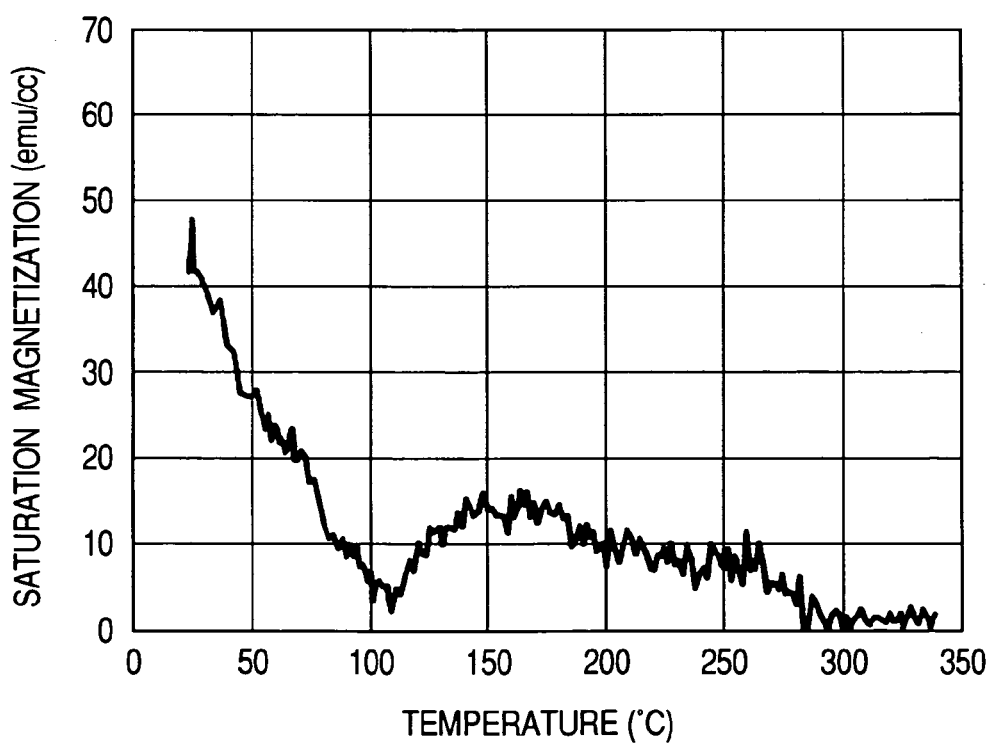
FIG. 7 is a graph showing temperature dependency of a net saturation magnetization of only the magnetic domain wall displacement layer in a magneto-optical recording medium of Example 4.

With respect to the magneto-optical recording medium of Example 1, a Gd content of the layer on the laser incident side (first layer 21) in the magnetic domain wall displacement layer 1 was reduced by one atom % to make the transition metal elements slightly predominant. FIG. 7 shows temperature dependency of a net saturation magnetization in the magnetic domain wall displacement layer 1 at this point. As shown in the figure, the saturation magnetization of the magnetic domain wall displacement layer 1 is 15 emu/cc in the vicinity of the Curie temperature $T_{c2}$ of the switching layer 2 (150° C.) (transition metal sublattice magnetization is predominant) and decreases toward the Curie temperature $T_{c1}$ of the magnetic domain wall displacement layer 1. However, the magnetic domain wall displacement layer 1 indicates a saturation magnetization of about 10 emu/cc even in the vicinity of 250° C. which is close to the Curie temperature $T_{c1}$.

When recording and reproduction of information was performed in this magneto-optical recording medium similarly to Example 1, a bit error rate of $1\times10^{-4}$ was obtained at a recording density of 0.075 μm/bit. However, a reproduction power margin was ±3%, which was a lower limit level in practical use.

EXAMPLE 5

Figure 8:
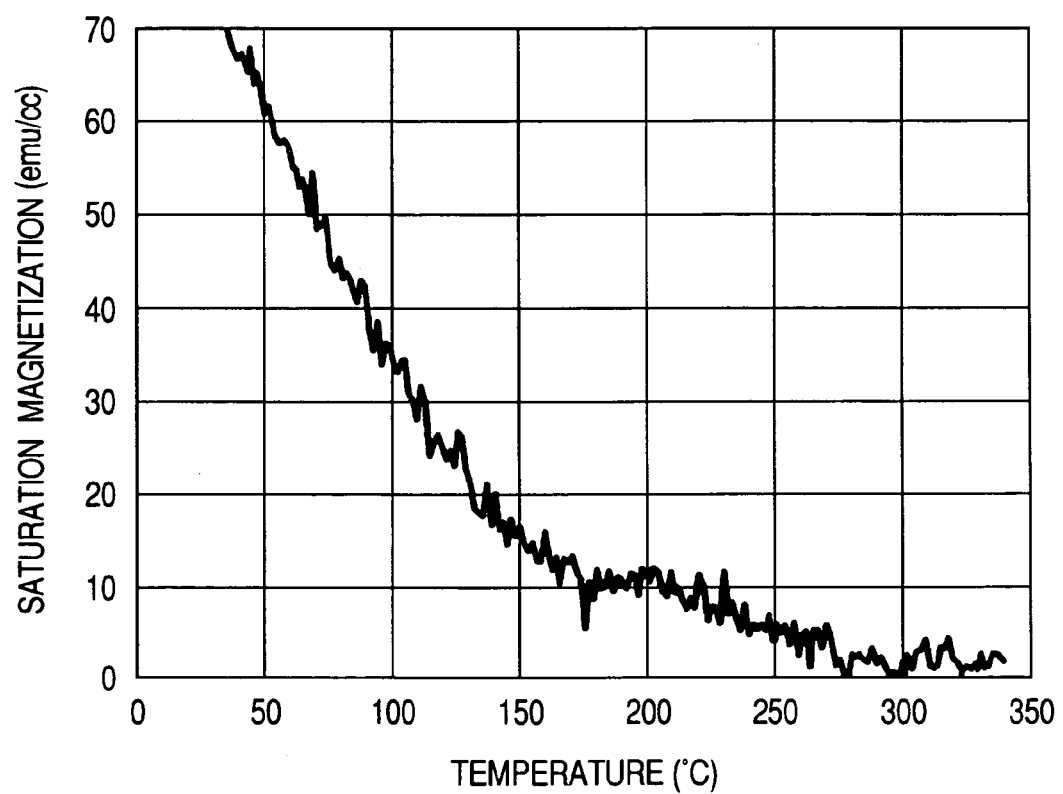
FIG. 8 is a graph showing temperature dependency of a net saturation magnetization of only the magnetic domain wall displacement layer in a magneto-optical recording medium of Example 5.

With respect to the magneto-optical recording medium of Example 1, a Gd content of the layer on the laser incident side (first layer 21) in the magnetic domain wall displacement layer 1 was increased by one atom % to make the rare earth elements slightly predominant. FIG. 8 shows temperature dependency of a net saturation magnetization in the magnetic domain wall displacement layer 1 at this point. As shown in the figure, the saturation magnetization of the magnetic domain wall displacement layer 1 is 15 emu/cc in the vicinity of the Curie temperature $T_{c2}$ of the switching layer 2 (150° C.) (rare earth element sublattice magnetization is predominant) and decreases toward the Curie temperature $T_{c1}$ of the magnetic domain wall displacement layer 1.

When recording and reproduction of information was performed in this magneto-optical recording medium similarly to Example 1, a bit error rate of $1\times10^{-4}$ was obtained at a recording density of 0.075 μm/bit. However, a reproduction power margin was ±4%, which was close to a lower limit level in practical use.

COMPARATIVE EXAMPLE 1

With respect to the same magneto-optical recording medium as Example 3, a Gd content of the layer on the laser incident side (first layer) in the magnetic domain wall displacement layer 1 was further decreased by one atom % to make the transition metal predominant. A net saturation magnetization of this magnetic domain wall displacement layer 1 was a maximum net saturation magnetization of 20 emu/cc in the vicinity of the Curie temperature $T_{c2}$ of the switching layer 2 (the transition metal sublattice magnetization is predominant) and 15 emu/cc in the vicinity of 250° C. When recording and reproduction of information was performed with respect to this magneto-optical recording medium similarly to Example 1 and an error rate was measured, the error rate was $4\times10^{-4}$ at a recording density of 0.075 μm/bit. A reason for such deterioration of the error rate will be described with reference to FIGS. 9A to 9C.

Figure 9A:
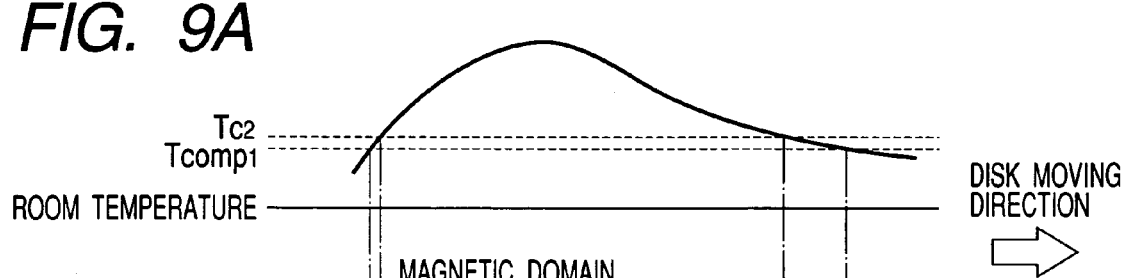
FIGS. 9A, 9B, and 9C are diagrams showing a structure and operations of a magneto-optical recording medium of Comparative Example 1.
Figure 9B:
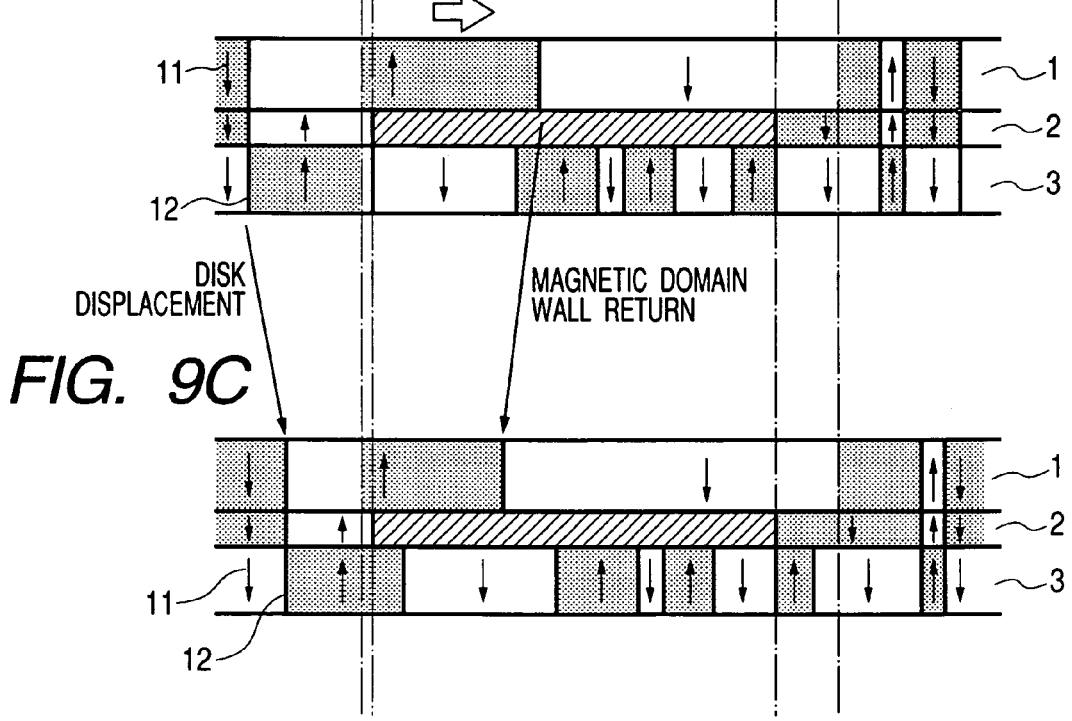
Figure 9C:

FIG. 9A shows a temperature distribution in a displacement magneto-optical recording medium as in FIG. 1A. In FIGS. 9B and 9C, as in FIG. 1A, arrows shown in respective layers represent directions of transition metal sublattice magnetizations, and presence or absence of shadings in a magnetic domain represent directions of net magnetizations. Shaded parts indicate that the net magnetization develops upward, and white parts indicate that the net magnetization develops downward. For simplification of explanation, it is assumed that, in the memory layer 3, a transition metal sublattice magnetization is predominant from the vicinity of the room temperature to the Curie temperature $T_{c3}$ thereof. In other words, when the arrow faces upward, the net magnetization also develops upward. In the switching layer 2, it is assumed that a rare earth element sublattice magnetization is predominant from the room temperature to the Curie temperature $T_{c2}$ thereof. In other words, when the arrow develops upward, the net magnetization faces downward. The magnetic domain wall displacement layer 1 has the compensation temperature $T_{comp1}$ at a temperature slightly lower than the Curie temperature $T_{c2}$ of the switching layer 2. In the magnetic domain wall displacement layer 1, it is assumed that a transition metal sublattice magnetization is predominant from the Curie temperature $T_{c2}$ of the switching layer 2 to the Curie temperature $T_{c1}$ of the magnetic domain wall displacement layer 1.

Figure 10:
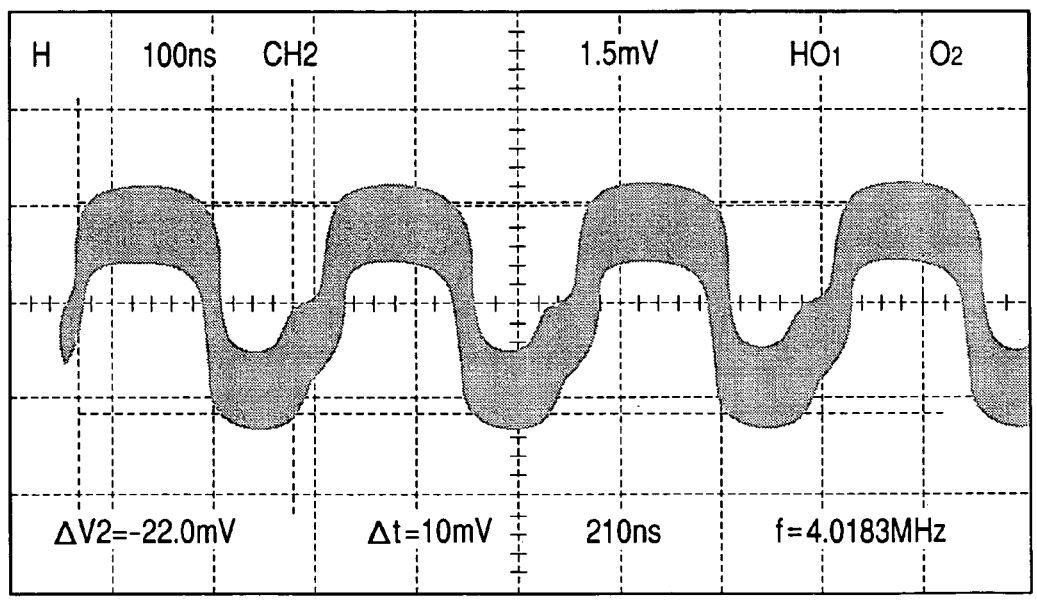
FIG. 10 is a photograph substituted for a drawing of an oscilloscope waveform representing a reproduced waveform at the time when information is reproduced from the magneto-optical recording medium of Comparative Example 1.

In FIG. 9B, the magnetic domain wall 12, which has approached the area of the temperature $T_{c2}$, moves toward a center of a spot in accordance with a temperature gradient. At this point, if a direction of a transition metal sublattice magnetization is opposite to the back of the spot, a magnetic domain wall exists in the center of the spot. In addition, a direction of a net magnetization is reversed across the position of the compensation temperature $T_{comp1}$ of the magnetic domain wall displacement layer 1. When the magneto-optical recording medium moves to the right in the figure from this state, and a downward magnetic domain in the memory layer 3 approaches the vicinity of a highest temperature of the spot, as shown in FIG. 9C, downward magnetizations pull each other magnetostatically. Therefore, the magnetic domain wall in the magnetic domain wall displacement layer 1 is pulled back toward the front of the spot. As a result, fluctuation occurs in a reproduced signal, which adversely affects reproduction. For example, in a reproduced signal in the case in which a repetitive pattern of 0.30 μm is recorded in this magneto-optical recording medium, as shown in FIG. 10, fluctuation of amplitude occurs in a polarity on a side where a magnetic domain wall exists in a spot.

COMPARATIVE EXAMPLE 2

Next, with respect to the same magneto-optical recording medium as Example 4, a Gd content of the layer on the laser incident side (first layer) in the magnetic domain wall displacement layer 1 was further increased by one atom % to make the rare earth elements predominant. A net saturation magnetization of this magnetic domain wall displacement layer 1 was a maximum net saturation magnetization of 20 emu/cc in the vicinity of the Curie temperature $T_{c2}$ of the switching layer 2 (rare earth element sublattice magnetization is predominant). When recording and reproduction of information was performed with respect to this magneto-optical recording medium similarly to Example 1 and an error rate was measured, the error rate was $3\times10^{-4}$ at a recording density of 0.075 μm/bit. A reason for such deterioration of the error rate will be described with reference to FIGS. 11A to 11C. FIG. 11A shows a temperature distribution in a displacement magneto-optical recording medium as in FIG. 9A. The same reference numerals as those of FIGS. 9B and 9C denote the same members thereof. Arrows and presence or absence of shading in a magnetic domain in FIGS. 11B and 11C represent directions of transition metal sublattice magnetizations and directions of net magnetizations, respectively, as in FIGS. 9A and 9B.

In the case in which a laser beam with a wavelength of 650 nm and an object lens with an NA (opening ratio) of 0.60 are used, a laser spot diameter is about 1 μm and a displacement distance of a magnetic domain wall is about 0.5 μm. Thus, in the case in which a relatively large mark of a size close to the displacement distance, for example, a recorded mark of 0.4 μm is reproduced, as shown in FIG. 11B, the magnetic domain wall 12 moves to a position of a highest temperature substantially in the spot. However, in the case in which a finer mark is recorded, as shown in FIG. 11C, a static magnetic field in a direction of preventing movement of the magnetic domain wall 12 from the shaded magnetic domain of the memory layer 3 in the figure is generated. Thus, the movement of the magnetic domain wall 12 stops in the middle. Therefore, when a length of a recorded mark is reduced, an amplitude of a reproduced signal decreases to deteriorate an error rate.

What is claimed is:

1. A magnetic domain wall displacement type magneto-optical recording medium, comprising:

a magnetic domain wall displacement layer in which a magnetic domain wall displaces to contribute to information reproduction, wherein the magnetic domain wall displacement layer comprises a plurality of magnetic layers containing at least a first magnetic layer and a second magnetic layer, a Curie temperature of the first magnetic layer is the highest among Curie temperatures of the plurality of magnetic layers and a Curie temperature of the second magnetic layer is the lowest among Curie temperatures of the plurality of magnetic layers;

a memory layer holding a recorded magnetic domain corresponding to the information; and a switching layer which is arranged between the magnetic domain wall displacement layer and the memory layer and has a Curie temperature lower than Curie temperatures of the magnetic domain wall displacement layer and the memory layer, wherein a magnitude of a net magnetization of the magnetic domain wall displacement layer in a temperature range from the Curie temperature of the switching layer to the Curie temperature of the first magnetic layer is 15 emu/cc or less, which is attained under the following conditions, (i) a compensation temperature of the first magnetic layer is higher than the Curie temperature of the second magnetic layer; and (ii) a temperature range in which a rare earth sublattice magnetization of the first magnetic layer is predominant and a temperature range in which a transition metal sublattice magnetization of the second magnetic layer is predominant overlap.

2. The magnetic domain wall displacement type magneto-optical recording medium according to claim 1, wherein the first magnetic layer is provided on a light incident side.

3. The magnetic domain wall displacement type magneto-optical recording medium according to claim 1, wherein a temperature difference between the Curie temperature of the first magnetic layer and the compensation temperature of the first magnetic layer is 30° C. or less.

* * * * *